(12) United States Patent
Picardi

(10) Patent No.: US 10,754,405 B1
(45) Date of Patent: Aug. 25, 2020

(54) POWER HANDLING THERMOSTAT

(71) Applicant: Alarm.com Incorporated, Tysons, VA (US)

(72) Inventor: Robert Nathan Picardi, Herndon, VA (US)

(73) Assignee: Alarm.com Incorporated, Tysons, VA (US)

( * ) Notice: Subject to any disclaimer, the term of this patent is extended or adjusted under 35 U.S.C. 154(b) by 129 days.

(21) Appl. No.: 15/979,558

(22) Filed: May 15, 2018

Related U.S. Application Data

(60) Provisional application No. 62/508,458, filed on May 19, 2017.

(51) Int. Cl.
| | |
|---|---|
| *G06F 1/30* | (2006.01) |
| *F24F 11/32* | (2018.01) |
| *F24F 11/00* | (2018.01) |
| *F24F 11/65* | (2018.01) |
| *G05B 19/042* | (2006.01) |
| *F24F 11/56* | (2018.01) |

(52) U.S. Cl.
CPC .......... *G06F 1/30* (2013.01); *F24F 11/0001* (2013.01); *F24F 11/32* (2018.01); *F24F 11/56* (2018.01); *F24F 11/65* (2018.01); *G05B 19/042* (2013.01); *G05B 2219/2614* (2013.01)

(58) Field of Classification Search
CPC ........ F24F 11/32; F24F 11/0001; F24F 11/65; F24F 11/56; G05B 19/042; G05B 2219/2614; G06F 1/30
See application file for complete search history.

(56) References Cited

U.S. PATENT DOCUMENTS

| | | | | |
|---|---|---|---|---|
| 4,177,923 A | | 12/1979 | Krump | |
| 4,249,696 A | | 2/1981 | Donnelly et al. | |
| 5,277,363 A | * | 1/1994 | Hart | G05D 23/1925 236/46 R |
| 5,570,837 A | * | 11/1996 | Brown | H02J 7/0045 236/46 R |
| 6,886,754 B2 | * | 5/2005 | Smith | F23N 5/203 236/10 |
| 2009/0099697 A1 | * | 4/2009 | Li | H02J 9/061 700/276 |
| 2010/0084482 A1 | * | 4/2010 | Kennedy | F24F 11/30 236/51 |

(Continued)

*Primary Examiner* — Chun Cao
(74) *Attorney, Agent, or Firm* — Fish & Richardson P.C.

(57) ABSTRACT

Methods and systems, including computer programs encoded on computer storage media, for using a power handling thermostat, the method including determining that (i) power to a thermostat is not available from line power of a ventilation system and (ii) power is available from a supercapacitor in the thermostat, drawing power from the supercapacitor instead of from the line power, determining that power is no longer available from the supercapacitor, in response to determining that power is no longer available from the supercapacitor, drawing power from a battery in the thermostat instead of from the supercapacitor, determining that power to the thermostat is available from the line power of the ventilation system, and in response to determining that power to the thermostat is available from the line power of the ventilation system, drawing power from the line power of the thermostat.

19 Claims, 5 Drawing Sheets

(56) References Cited

U.S. PATENT DOCUMENTS

| | | | |
|---|---|---|---|
| 2013/0218351 A1* | 8/2013 | Warren | G05D 23/1902 700/278 |
| 2014/0000858 A1* | 1/2014 | Frank | G05D 23/1905 165/201 |
| 2015/0045959 A1* | 2/2015 | McPherson | G05D 23/1951 700/276 |

* cited by examiner

US 10,754,405 B1

POWER HANDLING THERMOSTAT

CROSS-REFERENCE TO RELATED APPLICATIONS

This application claims the benefit of the U.S. Provisional Patent Application No. 62/508,458 filed May 19, 2017 and entitled "POWER HANDLING THERMOSTAT," which is incorporated herein by reference in its entirety.

TECHNICAL FIELD

This application relates to a control device.

BACKGROUND

Heating, ventilation, and air conditioning (HVAC) systems can utilize control devices such as thermostats to allow users of a property associated with the HVAC system to control environmental conditions within the property. In some cases, different HVAC system control devices may be compatible with different HVAC system components, such as different air conditioners, furnaces, humidifiers, fans, boilers, or other HVAC system components.

SUMMARY

Techniques are described for the control of an HVAC system associated with a property using a power handling thermostat device.

Implementations of the described techniques may include hardware, a method or process implemented at least partially in hardware, or a computer-readable storage medium encoded with executable instructions that, when executed by a processor, perform operations.

The details of one or more implementations are set forth in the accompanying description below. Other features will be apparent from the description and the drawings.

DETAILED DESCRIPTION

Techniques are described for providing indoor environmental control. In some implementations, a control system includes a power handling thermostat and is able to control the environment within a home, business, vacation, or other property based on the thermostat. The control system utilizes the thermostat to achieve control of heating, ventilation, and air conditioning (HVAC) systems associated with the property. The thermostat can feature terminals that are adaptable to support the function of various HVAC system components.

The thermostat may have various sensing and configurable features. In regards to power handling and power sensing, the thermostat may be powered by multiple different power sources so that if power is not available from one source, power can be drawn from another source. The thermostat can indicate that the power source the thermostat is drawing power from has changed so that a user can determine whether there is an issue with a power source. One power source of the thermostat may be a supercapacitor that the thermostat charges using power transfer. The thermostat may be configurable so that a button on the thermostat can be customized to perform a particular action. The thermostat may be able to directly communicate with other thermostats or mini split unit controller.

The thermostat may additionally or alternatively be self-configurable. Some other thermostats may require user input on the type of system the thermostat is controlling, and that input may determine the behavior of each of the terminals in various cases. The thermostat described herein may be able to identify which wires are installed in the thermostat using the voltage sensing technology detailed in the patent application. The thermostat may also infer the system type, and thus the wiring designation, based solely on the presence of certain combinations of wires. Knowing the combination of wires may allow assigning the system type and the only input from the installer, e.g., electrician, may be to confirm the assignment. This confirmation step may provide confidence that the assignment was correct and serve as a checkpoint for the installer to confirm their work. This may resolve issues where installers improperly configure a device, forget to change the default settings, or install a wire incorrectly. In addition to simply configuration, common wiring issues may be identified, if for instance a heat pump is installed without a g-wire for fan control, or other scenarios occur that cannot be possible.

Figure 1A:
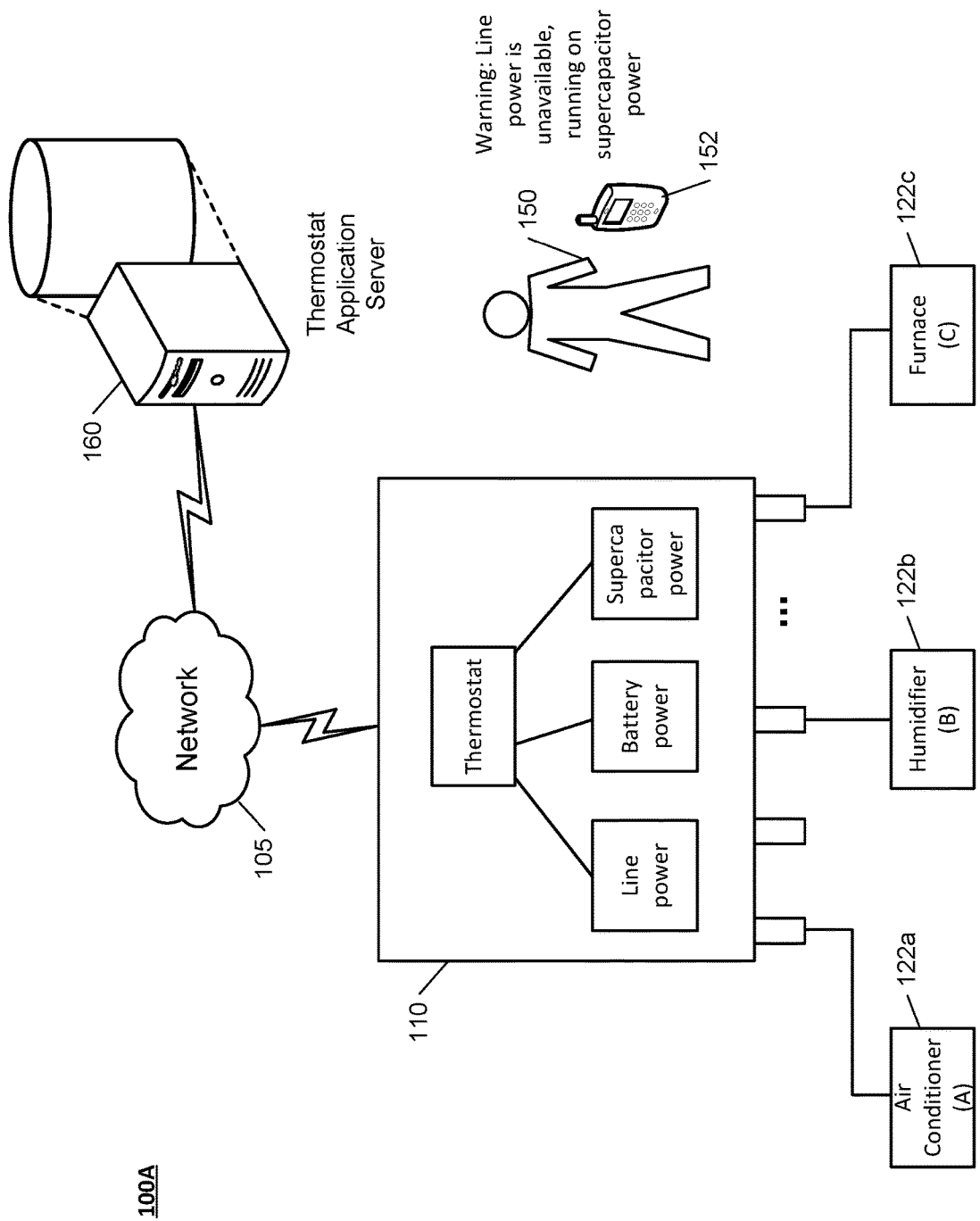
FIG. 1A illustrates an example of a power handling thermostat.
Figure 1B:
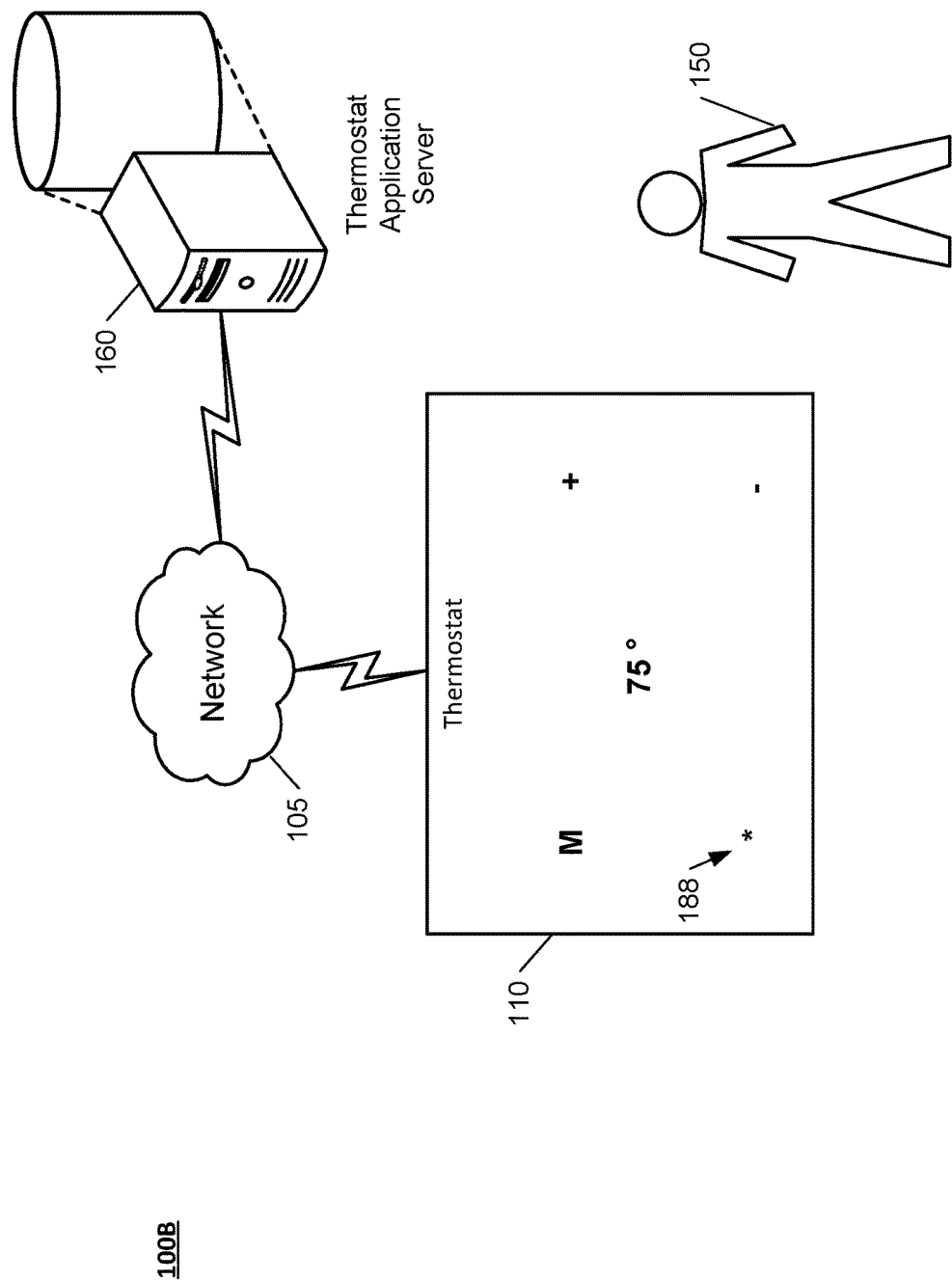
FIG. 1B illustrates an example of a user interface of a thermostat.
Figure 1C:
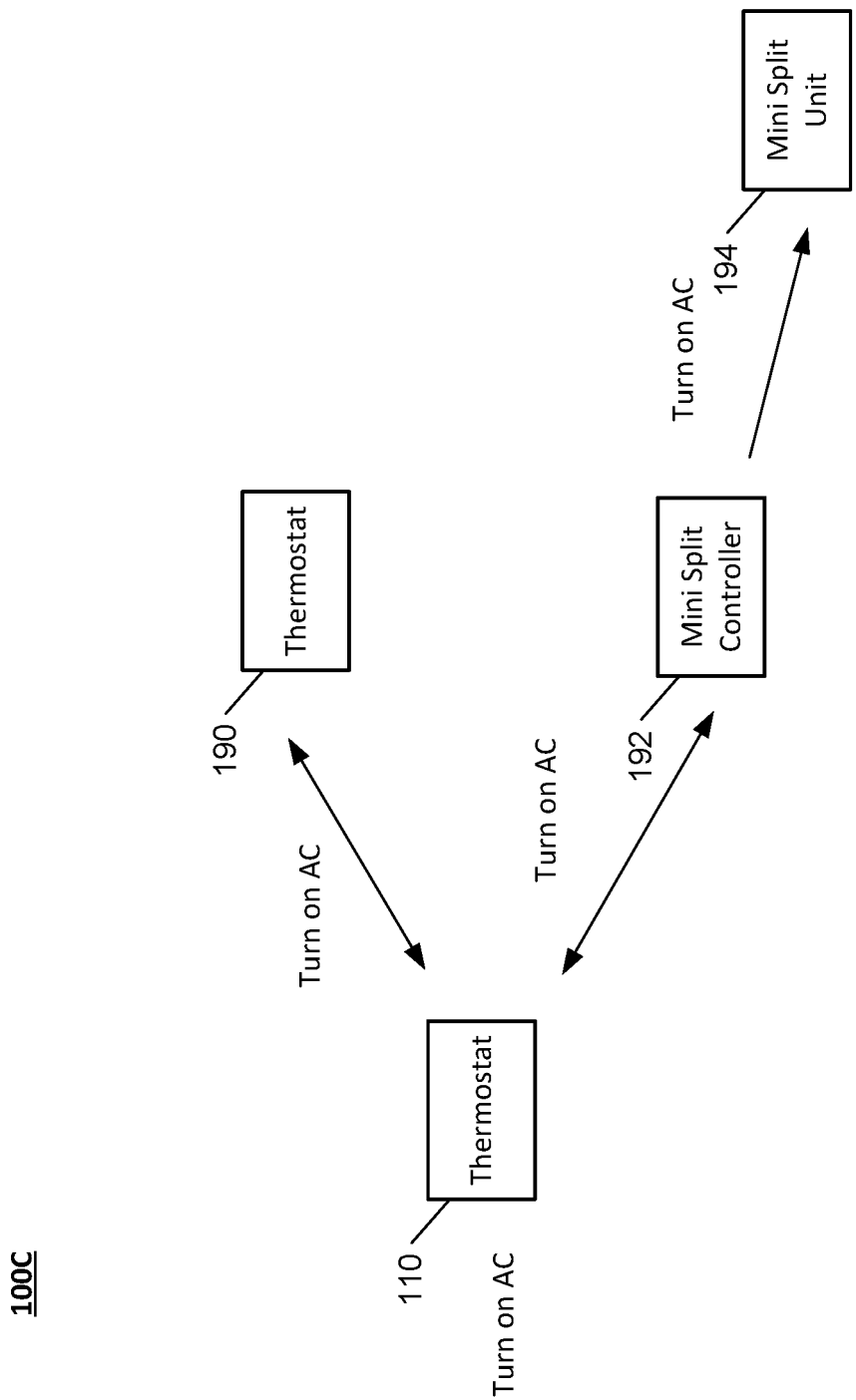
FIG. 1C illustrates an example of associations of a thermostat.

FIGS. 1A-1C illustrate an example application in which a power handling thermostat is used in an HVAC system associated with a property.

In the example shown in FIG. 1A, a control system 100A features a power handling thermostat 110, a thermostat application server 160, and HVAC system components 122a-122c. The power handling thermostat 110 is associated with relays 115a-115n or other interface ports that enable the power handling thermostat 110 to connect to the HVAC system components 122a-122c (air conditioner 122a, humidifier 122b, furnace 122c) for purposes of communicating and/or controlling the HVAC system components 122a-122c. The power handling thermostat 110 is also able to communicate with the thermostat application server 160 over a network 105. The thermostat application server can receive and provide information to the power handling thermostat 110 relating to the configuration, installation, and/or control of the HVAC system 100 associated with the property.

The power handling thermostat 110 can receive power from line power or battery power. The line power may be power that is drawn from the HVAC system. For example, the power handling thermostat 110 may be connected to a power wire, e.g., a R wire, and a common wire that provides ground, e.g., a C wire, where the voltage difference between the power wire and the common wire provides the line power. The battery power may be power from one or more batteries within the power handling thermostat 110. For example, the power handling thermostat 110 may house two AAA batteries that together provide the battery power.

The battery power of the power handling thermostat 110 may serve as a backup power source when line power is not available to the power handling thermostat 110. For example, when there is a power failure in a property the power handling thermostat 110 may switch to drawing power from the battery power until power is restored to the property.

In handling power from line power and battery power, the power handling thermostat 110 may monitor the line power and battery power to determine which power source to draw power from. For example, the power handling thermostat 110 may monitor the voltage difference between a power wire and a common wire, and when the voltage difference falls outside a predetermined range, e.g., 24-25V, the power handling thermostat 110 may switch to battery power.

Switching from line power when the voltage is below a range or a threshold may ensure that sufficient power is available to power the thermostat 110, and switching from line power when the voltage is above a range or a threshold may ensure that the thermostat 110 is not damaged by excess power. In another example, the power handling thermostat 110 may monitor the voltage difference between a power wire and a common wire, and when the voltage difference falls inside a predetermined range, e.g., 24-25V, the power handling thermostat 110 may switch to line power.

In some implementations, the power handling thermostat 110 may provide notifications regarding power. The notifications may notify someone that there is a problem with a power source. For example, a notification may be "Power is no longer available from line power" or "Battery power is low." The notifications may appear on the thermostat 110 itself, e.g., be shown on a display of the thermostat, or be transmitted by the thermostat 110 to another device, e.g., the thermostat application server 160 that then provides a notification to a mobile computing device 152 of a user 150. In some implementations, the thermostat 110 may continuously have a display lit when using line power and only be lit when a user is interacting with the thermostat 110 when not on line power.

The power handling thermostat 110 may provide a notification when determining to switch power source or detecting an issue with a power source. For example, the power handling thermostat 110 may determine to provide a notification that line power is not available when the thermostat 110 determines to switch to battery power. In another example, the power handling thermostat 110 may determine to provide a notification that battery power is low when the thermostat 110 determines that there is little battery power remaining. In some implementations, the notifications may include additional detail regarding the sources. For example, the thermostat 110 may provide a notification, "Voltage provided by line power is 8V, outside the expected range of 24-25V. Please correct the voltage. Switching to battery power which is expected to last five more days."

In some implementations, the power handling thermostat 110 may include a supercapacitor. The supercapacitor may provide supercapacitor power to the power handling thermostat 110, and the power handling thermostat 110 may charge the supercapacitor using power drawn from closed relays. For example, the thermostat 110 may draw a small enough amount of power from a closed relay for a humidifier so that the humidifier remains on and charge the supercapacitor using the drawn power. When the thermostat 110 determines that no relays are closed, the thermostat 110 may close a relay for a short amount of time, and during that time, draw the power through the closed relay for us in charging the supercapacitor. For example, the thermostat 110 may determine that no relays are closed, that a supercapacitor has a charge below a predetermined percentage or amount, that the thermostat 110 is using line power and, in response, close a relay for a humidifier, draw all the power from the closed relay for use in charging the supercapacitor, and quickly open the relay for the humidifier so that the humidifier is not actually turned on.

The power handling thermostat 110 may use the supercapacitor power as an initial backup when line power is not available, and the battery power as a secondary backup when both line power and supercapacitor power is not available. For example, the power handling thermostat 110 may detect that line power is not available, then switch to supercapacitor power, once the supercapacitor power is drained, then switch to battery power.

The power handling thermostat 110 may similarly provide notifications when using supercapacitor power. For example, the power handling thermostat 110 may provide a notification of "Warning: Line power is not available, running on supercapacitor power" to the thermostat application server 160 that then provides a notification to the mobile computing device 152 of the user 150.

In some implementations, the power handling thermostat 110 may switch between supercapacitor power and battery power. For example, the thermostat 110 may switch to battery power when line power and supercapacitor power is not available. While the thermostat 110 is powered using battery power the thermostat 110 may use draw power from closed relays to charge the supercapacitor. When the power handling thermostat 110 determines that the supercapacitor is sufficiently charged, the thermostat 110 may switch back to supercapacitor power and once the supercapacitor power is drained switch back to the battery power. The cycle may continue until either the battery power is also drained or line power returns. Alternatively, in some implementations, the power handling thermostat 110 may only draw power for charging the supercapacitor while the thermostat 110 is using line power so the thermostat 110 may not cycle between battery power and supercapacitor power.

In some implementations, the thermostat 110 may be able to detect whether or not there is voltage at all terminals, although in some implementations may only be able to detect voltage levels for terminals for a power wire and a ground. Due to the thermostat's 110 capability of sensing the presence of voltage at every terminal, the thermostat may determine exactly how it is wired. For example, based on whether or not voltage is present at all terminals there may be a finite number of configurations that correlate to valid thermostat wiring, and so the thermostat 110 be able to self-configure using this information. This may save technicians time and reduce the number of misconfigured systems that require call backs and result in poor customer experiences. In addition, the thermostat 110 be able to alert if there is a wiring issue at installation or if a connection that had existed was lost.

In the example shown in FIG. 1B, the system 100B includes the power handling thermostat 110 having a configurable button 188. The configurable button 188 may be configured by the user 150 to cause the thermostat 110 to perform a particular function. For example, the user 150 may configure the configurable button 188 to be a fan control button that controls a speed of a fan, a blast button that runs heat or air conditioning at full power for a preset length of time regardless of temperature set point, a contact dealer button that sends an alert to the dealer for immediate support, or some other function.

The thermostat 110 may be configured by the user 150 through an interface on the thermostat or through the application server 160. For example, the user 150 may configure a function for the configurable button 188 solely through interacting with the physical interface of the thermostat 110.

In another example, the user 150 may configure a function for the configurable button 188 solely through interacting with a web interface provided through the thermostat application server 160.

While the configurable button 188 is shown in FIG. 1B in the lower left corner of the thermostat 110 and on the thermostat 110 is a button labeled "M" is in an upper left corner, a plus button labeled "+" is in an upper right corner, and a minus button labeled "−" is in a lower right corner, the buttons may be arranged in a different order, in different areas of the thermostat 110, or with additional or fewer buttons.

In the example shown in FIG. 1C, the system 100B includes the power handling thermostat 110 controlling another thermostat 190, and controlling a mini split unit 194 through a mini split controller 192. The power handling thermostat 110 may be able to directly communicate to the other thermostat 190 without relying on a hub or panel, enabling potentially faster and more reliable communication than through a server 160. For example, the thermostat 110 may be configured to pair with the thermostat 190 so that communications are directly sent from one to the other through short range wireless communications, e.g., Z-wave, Bluetooth, or Wi-Fi, etc. Accordingly, the thermostat 110 may be on one side of a large room, determine to turn on air conditioning, switch on a relay for the air conditioning unit, and directly send a communication to the other thermostat 190 on another side of the room to also turn on a relay of the other thermostat 190 for controlling another air conditioning unit on the other side of the room.

Similarly, the power handling thermostat 110 may communicate to a mini split unit 194 without relying on a hub or panel. The mini split unit 194 may be controlled through infrared (IR) signals and the power handling thermostat 110 may communicate through non-infrared signals, e.g., radio signals. Accordingly, the power handling thermostat 110 may communicate with the mini split unit 194 through the mini split controller 192. The mini split controller 192 may communicate with the power handling thermostat 110 through non-infrared signals and communicate with the mini split unit 194 through IR signals.

For example, the thermostat 110 may send an instruction of turn on air conditioning to the mini split controller 192 through a Z-wave communication. The mini split controller 192 may be within line of sight of the mini split unit 194 and then transmit an instruction of turn on air conditioning to the mini split unit 194 through an IR signal.

Figure 2:
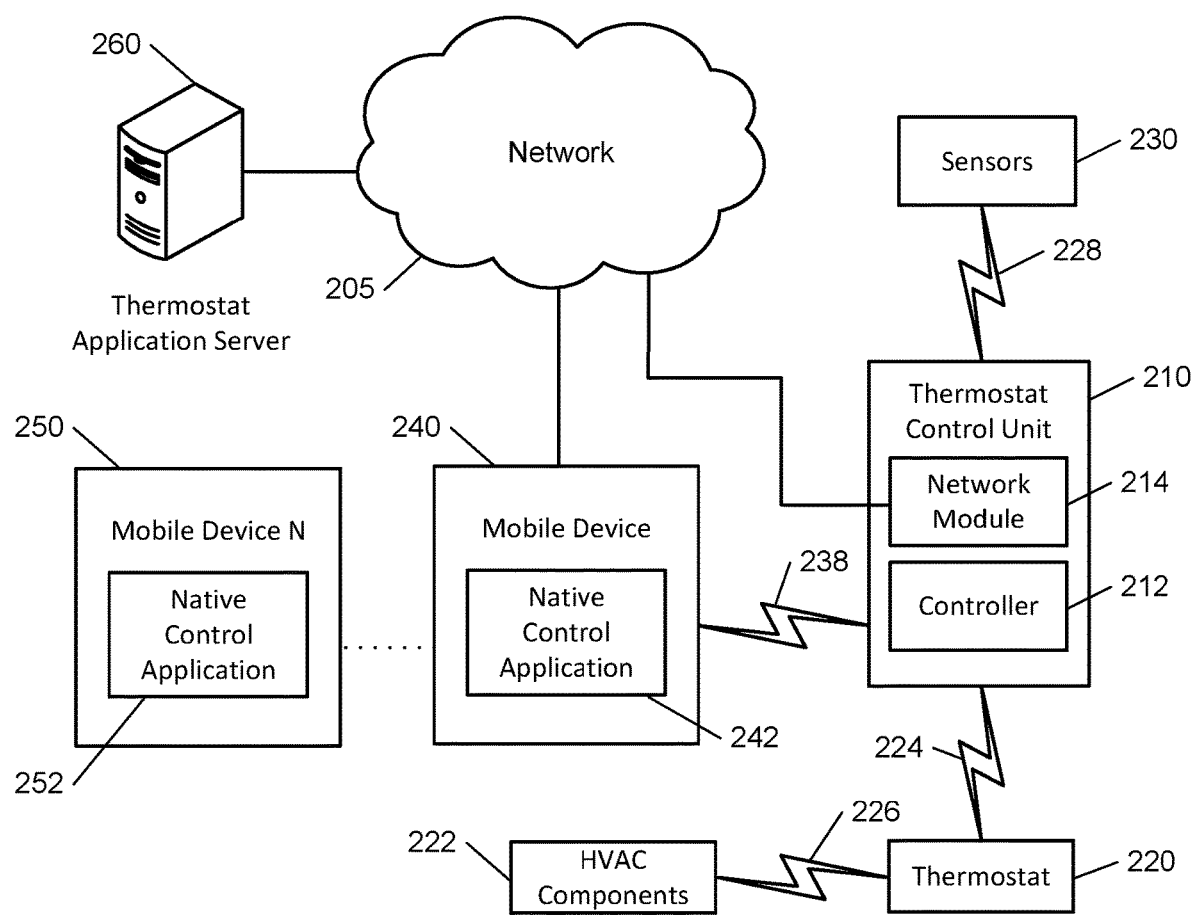
FIG. 2 illustrates an example system capable of power handling by a power handling thermostat.

FIG. 2 illustrates an example of a control system 200 featuring a power handling thermostat used to operate an HVAC system. The control system 200 includes a network 205, a thermostat control unit 210, one or more mobile devices 240, 250, and a thermostat application server 260. In some examples, the network 205 enables communications between the thermostat control unit 210, the one or more mobile devices 240, 250, and the thermostat application server 260.

The network 205 is configured to enable electronic communications between devices connected to the network 205. For example, the network 205 can be configured to enable exchange of electronic communications between the thermostat control unit 210, the one or more mobile devices 240, 250, and the thermostat application server 260.

The network 205 can include, for example, one or more of the Internet, Wide Area Networks (WANs), Local Area Networks (LANs), e.g., Wi-Fi, analog or digital wired and wireless telephone networks, e.g., a public switched telephone network (PSTN), Integrated Services Digital Network (ISDN), a cellular network, and Digital Subscriber Line (DSL), Ethernet, Internet Protocol (IP) over broadband, radio, television, cable, satellite, or any other delivery or tunneling mechanism for carrying data. Network 205 can include multiple networks or subnetworks, each of which can include, for example, a wired or wireless data pathway. The network 205 can include a circuit-switched network, a packet-switched data network, or any other network able to carry electronic communications, e.g., data or voice communications. For example, the network 205 can include networks based on the Internet protocol (IP), asynchronous transfer mode (ATM), the PSTN, packet-switched networks based on IP, X.25, or Frame Relay, or other comparable technologies and can support voice using, for example, VoIP, or other comparable protocols used for voice communications. The network 205 can include one or more networks that include wireless data channels and wireless voice channels. The network 205 can be a wireless network, a broadband network, or a combination of networks including a wireless network and a broadband network.

The thermostat control unit 210 is configured to control a power handling thermostat 220 and includes a controller 212 and a network module 214. The controller 212 is configured to control a system that includes the thermostat control unit 210, e.g., a system for controlling a power handling thermostat 220 associated with a property's HVAC system. In some examples, the controller 212 can include a processor or other control circuitry configured to execute instructions of a program that controls operation of the power handling thermostat 220. In these examples, the controller 212 can be configured to receive inputs from sensors, detectors, one or more servers, or other devices associated with the system 200 and to control operation of the power handling thermostat 220 that is associated with the property's HVAC system. In some instances, the controller 212 can be configured to control operation of the network module 214 included in the thermostat control unit 210.

The network module 214 is a communication device configured to exchange communications over one or more networks 205. The network module 214 can be a wireless communication module configured to exchange wireless communications over the network 205. For example, the network module 214 can be a wireless communication device configured to exchange communications over a wireless data channel. In this example, the network module 214 can transmit and/or receive data relating to identified HVAC system components connected to terminals of the power handling thermostat 220, data associated with control processes used to control the components of the HVAC system using the power handling thermostat 220, environmental data associated with the property, and/or weather forecast data relating to the geographic region of the property. The wireless communication device can include one or more GSM modules, a radio model, a cellular transmission module, or any type of module configured to exchange communications in one of the following formats: GSM or GPRS, CDMA, EDGE or EGPRS, EV-DO or EVDO, UMTS, or IP.

In some implementations, the network module 214 is a wired communication module configured to exchange communications over the network 205 using a wired connection. For instance, the network module 214 can be a modem, a network interface card, or another type of network interface device. The network module 214 can be an Ethernet network card configured to enable the thermostat control unit 210 to communicate over a local area network and/or over the Internet. The network module 214 can also be a voiceband modem configured to enable the thermostat control unit to communicate over the telephone lines of Plain Old Telephone Systems (POTS).

The thermostat control unit 210 associated with the control system communicates with sensors connected to a module 230 and a power handling thermostat 220 that controls the HVAC system associated with the property. The module 230 is connected to one or more sensors configured to monitor the environment of the property at various locations, e.g., at various indoor and outdoor locations of the property, and can also be configured to monitor activity at the property. For example, the module 230 can be connected to one or more environmental sensors, such as one or more temperature sensors, humidity sensors, noise sensors, light sensors, air quality sensors, smoke detectors, carbon monoxide detectors, water sensors, rain sensors, wind sensors, etc. Sensors for monitoring activity at the property can include, for example, one or more motion sensors, contact sensors, etc. The module 230 connected to the one or more sensors can communicate data obtained by the sensors to the thermostat control unit 210. For example, the module 230 can transmit sensor data indicating environmental conditions at various locations within the property, e.g., a temperature and humidity in each room of a home, and activity within the property, e.g., which rooms of the home are currently occupied, to the thermostat control unit 210.

The power handling thermostat 220 is configured to monitor temperature and/or energy consumption of an HVAC system associated with the thermostat, and is further configured to dynamically control the operation of the HVAC system. In some instances, the power handling thermostat 220 may receive data identifying one or more operating processes used by the power handling thermostat 220 to control an HVAC system. Additionally or alternatively, the power handling thermostat 220 can send and/or receive information identifying and/or providing information relating to HVAC system components that are connected to terminals of the power handling thermostat 220. In some implementations, the power handling thermostat 220 can, additionally or alternatively, receive data relating to environmental conditions at the property, e.g., at various locations indoors and/or outdoors at the property, can receive data identifying weather forecasts for the geographic region of the property, and/or can receive data relating to activity at the property. The power handling thermostat 220 can directly measure energy consumption of the HVAC system associated with the power handling thermostat 220, or can estimate energy consumption of the HVAC system associated with the power handling thermostat 220. The power handling thermostat 220 can communicate data relating to control of the components of the HVAC system associated with module 222, for example, by communicating data relating to control of the HVAC system components received from the thermostat control unit 210.

In some implementations, the power handling thermostat 220 can be integrated with the thermostat control unit 210. For example, the power handling thermostat 220 can include the thermostat control unit 210, e.g., as an internal component to the power handling thermostat 220. In other implementations, the thermostat control unit 210 can be a gateway device that communicates with the power handling thermostat 220.

The module 222 is connected to one or more components of an HVAC system associated with the property and is configured to control the operation of the one or more components of the HVAC system. In some implementations, the module 222 is also configured to monitor energy consumption and/or operating parameters of the HVAC system components, for example, by directly or indirectly measuring the energy consumption of the one or more components of the HVAC system or by estimating the energy usage of the one or more components of the HVAC system based on detecting that one or more components of the HVAC system are active. The module 222 can communicate energy monitoring information and/or data identifying the state of the HVAC system components to the module 220 associated with the power handling thermostat 220 and can control the one or more components of the HVAC system based on commands received from the power handling thermostat 220.

The power handling thermostat 220 and the module 230 can communicate with the controller 212 over communications links 224 and 228, and module 222 can communicate with the power handling thermostat 220 over communication link 226. The communication links 224, 226, and 228 can be wired or wireless data pathways configured to transmit signals from the modules 222, 230 to the controller 212 and from the module 222 to the power handling thermostat 220. The power handling thermostat 220 and the modules 222 and 230 can continuously transmit information, can periodically transmit information, or can transmit information in response to a change in sensed values, operating conditions, operating processes, HVAC system component connections, etc.

In some implementations, connections through communication links 224, 226, and 228 can use one or more short-range wireless technologies, such as Bluetooth, Wi-Fi, near field communication (NFC), ZigBee, Z-Wave, dedicated short-range communication (DSRC), or other short-range wireless technologies. In some examples, the communication links 224, 226, and 228 can utilize wired connections such as one or more Ethernet connections, HomePlug (Ethernet over powerline) or other powerline connections, universal serial bus (USB) connections, wired connections based on the RS232, RS485, and/or RS422 standards, or other wired connections. In some instances, the communication links 224, 226, and 228 can communicate over one or more networks, such as one or more local area networks (LAN) or wide area networks (WAN), such as the Internet.

In some implementations, the module 222 associated with one or more components of an HVAC system can communicate directly with the thermostat control unit 210. For example, the thermostat control unit 210 can communicate with the module 222 to send and/or receive information related to controlling the components of the HVAC system components, information relating to the energy usage of the HVAC system components, or other information. In some instances, the power handling thermostat 220 can communicate information to the thermostat control unit 210, and the thermostat control unit 210 can communicate the information received from the power handling thermostat 220 to the module 222 associated with the one or more HVAC system components.

The thermostat application server 260 is an electronic device configured to provide control services by exchanging electronic communications with the thermostat control unit 210 and the one or more mobile devices 240, 250 over the one or more networks 205. For example, the thermostat application server 260 can be configured to monitor data obtained by the thermostat control unit 210. In this example, the thermostat application server 260 can exchange electronic communications with the network module 214 included in the thermostat control unit 210 to send and/or receive information regarding HVAC system components connected to the power handling thermostat 220, operating processes relating to the property's HVAC system, information regarding the environment at the property, and/or weather forecast data for the geographic region of the property. In some implementations, the thermostat application server 260 can exchange communications with the one or more mobile devices 240, 250 to send and/or receive information relating to the operation of the property's HVAC system. For example, the thermostat application server 260 can send and/or receive information from the one or more mobile devices 240, 250 that indicates updates to operating processes relating to the property's HVAC system, and/or can enable access or monitoring of the operation of the HVAC system by a user or technician associated with the HVAC system.

In some implementations, the thermostat application server 260 can access weather data and/or weather forecast data for the geographic region of the property, and the weather data and/or weather forecast data can be used in determining control of the HVAC system associated with the property. For example, the thermostat application server 260 can be connected to the Internet over one or more networks 205 and can access weather data and/or weather forecast data at a website or database that is accessible on the Internet. The weather data can include current weather data for the geographic region of the property, such as a current temperature, humidity, due point, wind chill, heat index, barometric pressure, etc., and weather forecast data can include short and/or long term weather forecasts, for example, short and long term temperature forecasts, precipitation forecasts, etc.

The thermostat application server 260 can store data, e.g., data relating to HVAC system component connections, HVAC system operating processes, weather data, and/or weather forecast data. In some instances, the thermostat application server 260 can receive the data from the thermostat control unit 210, the mobile devices 240, 250, and/or the Internet, and can perform analysis of the stored data. Based on the analysis, the thermostat application server 260 can communicate with the thermostat control unit 210, for example, to provide HVAC system component connectivity information, HVAC system operating processes, or other information relating to the operation of the HVAC system associated with the property.

The one or more mobile devices 240, 250 are devices that host one or more native applications, e.g., the native control applications 242, 252. The one or more mobile devices 240, 250 can be cellular phones or non-cellular locally networked devices. The one or more mobile devices 240, 250 can include a cell phone, a smart phone, a tablet computer, a personal digital assistant ("PDA"), a laptop computer, desktop computer, or any other device configured to communicate over a network. For example, implementations can also include Blackberry-type devices, e.g., as provided by Research in Motion, electronic organizers, iPhone-type devices, e.g., as provided by Apple, iPod devices, e.g., as provided by Apple, or other portable music players, other communication devices, and handheld or portable electronic devices for gaming, communications, and/or data organization. The one or more mobile devices 240, 250 can be the same or can include mobile devices of different types. The one or more mobile devices 240, 250 can perform functions unrelated to the control system, such as placing personal telephone calls, playing music, playing video, displaying pictures, browsing the Internet, maintaining an electronic calendar, etc.

In some implementations, the one or more mobile devices 240, 250 communicate with and receive control system data from the thermostat control unit 210 using the communication link 238. For instance, the one or more mobile devices 240, 250 can communicate with the thermostat control unit 210 using various local wireless protocols, such as Wi-Fi, Bluetooth, Z-Wave, ZigBee, HomePlug (Ethernet over powerline), or wired protocols such as Ethernet, USB, and other wired protocols based on the RS232, RS485, and/or RS422 standards. The one or more mobile devices 240, 250 can connect locally to the control system and its sensors and other devices, or can connect to the control system and its sensors or other devices over one or more networks 205. In some instances, a local connection can improve the speed of communications because communicating through the network 205 with a remote server, e.g., the thermostat application server 260, can be slower.

Although the one or more mobile devices 240, 250 are shown communicating with the thermostat control unit 210, the one or more mobile devices 240, 250 can communicate directly with the sensors and other devices controlled by the thermostat control unit 210. In some implementations, the one or more mobile devices 240, 250 replace the thermostat control unit 210 and perform the functions of the thermostat control unit 210 for local control and long range or offsite communication.

In other implementations, the one or more mobile devices 240, 250 receive control system data captured by the thermostat control unit 210 through the network 205. The one or more mobile devices 240, 250 can receive the data from the thermostat control unit 210 through the network 205, or the thermostat application server 260 can relay data received from the thermostat control unit 210 to the one or more mobile devices 240, 250 through the network 205. In this regard, the thermostat application server 260 can facilitate communications between the one or more mobile devices 240, 250 and the thermostat control unit 210.

Although the one or more mobile devices 240, 250 are shown in FIG. 2 as being connected to the network 205, in some implementations, the one or more mobile devices 240, 250 are not connected to the network 205. In these implementations, the one or more mobile devices 240, 250 communicate directly with one or more of the control system components and no network connection, e.g., connection to the Internet, or reliance on remote servers is needed.

In some implementations, the one or more mobile devices 240, 250 are used in conjunction with only the sensors, the components of the HVAC system associated with the property, and the power handling thermostat 220. In these instances, the control system 200 only includes the one or more mobile devices 240, 250, the power handling thermostat 220, and the modules 222 and 230 associated with the HVAC system components and the sensors at the property, respectively. The one or more mobile devices 240, 250 receive data directly from the power handling thermostat 220 and the modules 222 and 230, and send data directly to the power handling thermostat 220 and the modules 222 and 230. The one or more mobile devices 240, 250 provide the appropriate interfaces/processing to provide control information, modify settings and/or processes, set or control the power handling thermostat 220, control HVAC system component operations, etc.

The one or more mobile devices 240, 250 can each include a native control application 242, 252, respectively. The native control application 242, 252 refers to a software/firmware program running on the mobile devices that enables the features described below. The one or more mobile devices 240, 250 can load or install the native control application 242, 252 based on data received over one or more networks, such as one or more networks 205, or based on data received from local media. The native control application 242, 252 can run on operating platforms associated with the mobile devices 240, 250, such as Apple iOS, iPhone, iPod touch, Blackberry, Google Android, Windows Mobile, etc.

The control system 200 includes the thermostat 220 that can be dynamically programmed to control any number of HVAC system configurations and combinations of HVAC system components. In some instances, the power handling thermostat 220 can be a wall-mounted thermostat device that features one or more 24 Volt (V) relays for connection to components of an HVAC system. The power handling thermostat 220 can adapt the one or more 24 V relays to operate any number of HVAC system components, such as an air conditioner, fan, furnace, humidifier, dehumidifier, external air baffle, etc. By featuring adaptable relays, the power handling thermostat 220 can support a number of potential HVAC system configurations without requiring the hardware to support each configuration simultaneously. For example, a single relay and output terminal associated with the power handling thermostat 220 can be used to operate one of an external air baffle, a humidifier, or a dehumidifier based on the configuration of that particular relay associated with the power handling thermostat 220.

In some implementations, configuring a relay of a power handling thermostat 220 to operate a particular HVAC system component can include configuring the power handling thermostat 220 to support the operation of the particular HVAC system component. In some instances, configuring the power handling thermostat 220 is performed by accessing a web-based or mobile application, for example, by accessing a web-based or mobile application at the thermostat application server 260 over one or more networks 205. Additionally or alternatively, the power handling thermostat 220 can be configured to operate a particular HVAC system component by accessing information stored locally at the thermostat.

In some implementations, configuring a relay of the power handling thermostat 220 to operate a particular HVAC system component can include accessing instructions relating to installing and/or wiring the particular HVAC system component and outputting instructions relating to installing and/or wiring the particular HVAC component to a user or installer of the component. For example, the power handling thermostat 220 can access and output, for example, at a display of the thermostat, information identifying wiring diagrams and/or installation instructions for a humidifier component based on determining that an installer or user of the thermostat is attempting to install a humidifier for the HVAC system. In some instances, the instructions relating to installing and/or wiring the particular HVAC component can be accessed over one or more networks 205, for example, at the thermostat application server 260 or at a website or database accessible on the Internet. In some instances, the instructions to install and/or wire the particular HVAC component can be accessed locally at the power handling thermostat 220.

In some implementations, a display associated with the power handling thermostat 220 can be an electrophoretic ink (E Ink) display, such as those provided by E Ink Corporation, or any other bi-stable, high contrast, low power display. The electrophoretic display can output instructions, wiring diagrams, schematics, and/or other information relating to the configuration or operation of HVAC system components. Integration of an electrophoretic ink display can enable the power handling thermostat 220 to output detailed instructions and other information, while maintaining energy efficient operation of the thermostat.

In some implementations, a display associated with the power handling thermostat can be dynamic in that it enables users to determine information that is and is not presented at the display. For example, a user can interact with the display of the power handling thermostat to specify information that can be provided for output at the display. Information not output at the display of the power handling thermostat can be viewable at another interface, such as by accessing a web or mobile-based application at the mobile devices 240, 250. By enabling the end user to customize the display of the power handling thermostat, the display is not burdened with displaying complex graphics or information, since such information may be accessible elsewhere. For example, an extensive list of HVAC system component setup types or instructions, e.g., pertaining to a heat pump, gas/electric switch, fan, etc., may not be displayed at a power handling thermostat if this information is accessible and more easily viewed using an application on a mobile device 240, 250.

In some examples, the power handling thermostat 220 can identify an HVAC system configuration being controlled by the power handling thermostat 220, or can determine a particular HVAC system component associated with a particular relay of the thermostat. Based on determining the HVAC system configuration or particular HVAC system component associated with the particular relay, the power handling thermostat 220 can output instructions and/or wiring diagrams associated with configuring the HVAC system configuration or HVAC system component. For example, the power handling thermostat 220 can output an image at a display of the thermostat that indicates the proper terminals of the thermostat to which the HVAC system or component wiring should connect.

For example, an HVAC system configuration can include a single heat, single cool system with humidification, and the power handling thermostat 220 can output, at a display of the thermostat, instructions indicating the required connections between the relays of the thermostat and the wiring of the furnace, air conditioner, and humidifier of the HVAC system. In this example, output instructions may indicate that a user or installer should connect a power wire to a first terminal of the power handling thermostat 220, a heat wire to a second terminal of the power handling thermostat 220, a fan wire to a third terminal of the power handling thermostat 220, a humidifier wire to a fourth terminal of the power handling thermostat 220, and a cool wire to a fifth terminal of the power handling thermostat 220. The power handling thermostat 220 may store configuration data indicating that the first terminal is associated with a power wire, the second terminal is associated with a heat wire, the third terminal is associated with a fan wire, the fourth terminal is associated with a humidifier wire, and the fifth terminal is associated with a cool wire. The stored configuration data may enable the power handling thermostat 220 to appropriately control the HVAC system with the dynamically established input terminals. To the extent the configuration of the HVAC system changes or the power handling thermostat 220 is moved to another HVAC system, the terminals may be dynamically reassigned and the configuration data may be updated to reflect the new configuration resulting from reassignment of the terminals.

In some implementations, an HVAC system configuration or a particular HVAC system component is determined based on user inputs indicating a particular HVAC system configuration or a particular HVAC system component that is to be connected to the power handling thermostat 220. For example, the thermostat can provide a menu interface at a display of the thermostat, and a user or installer of the HVAC system can input information identifying a particular HVAC system configuration or a particular HVAC system component or components that the thermostat will control. In another example, users and/or installers of the HVAC system can input information identifying a particular HVAC system configuration and/or a particular HVAC system component or components at a mobile device 240, 250, for example, using a menu associated with the native control applications 242, 252.

In other implementations, determining a particular HVAC system configuration or one or more HVAC system components is accomplished based on detecting a connection of the HVAC system having the particular configuration to the power handling thermostat 220 or based on detecting connection of the one or more HVAC system components to the thermostat. For example, software drivers or other information can be received and/or detected by the power handling thermostat 220 and used to determine that an HVAC system having a particular configuration or one or more particular HVAC system components have been connected to the thermostat. In other examples, data relating to the drivers or information can be transmitted by the power handling thermostat 220, and the thermostat can receive information identifying the HVAC system configuration and/or the one or more HVAC system components. For example, the thermostat can transmit data relating to the drivers or other information to the thermostat application server 260 via the thermostat control unit 210 and/or over one or more networks 205, and the power handling thermostat 220 can receive information identifying the particular HVAC system configuration or one or more HVAC system components connected to the thermostat.

In addition to accessing and providing instructions relating to the configuration of an HVAC system or one or more components of an HVAC system, the power handling thermostat 220 can access and implement processes associated with the operation of the HVAC system or one or more HVAC system components. For example, the power handling thermostat 220 can access a process associated with the operation of an air conditioner of a property's HVAC system, and can operate the air conditioner based on the process to cool the property to a user-desired temperature. In some instances, the power handling thermostat 220 can access operating processes locally, for example, at a controller 212 associated with the thermostat control unit 210 integrated with the thermostat 220, at a memory associated with the thermostat, etc. In other implementations, the power handling thermostat 220 can access operating processes over one or more networks 205, for example, by accessing the processes at the thermostat application server 260 or at a website or database on the Internet.

In some instances, the power handling thermostat 220 can access the operating processes based on determining that an HVAC system having a particular configuration or one or more particular components of an HVAC system have been configured to operate with the thermostat. For example, the thermostat 220 can access operating processes associated with an air conditioner of an HVAC system based on determining that the air conditioner has been configured to operate with the thermostat. In other implementations, the thermostat can access the one or more processes, and based on determining that an HVAC system having a particular configuration or one or more particular HVAC system components have been configured to operate using the thermostat, the power handling thermostat 220 can implement the proper process.

In some instances, the power handling thermostat 220 accesses operating processes over one or more networks 205 while a network connection exists, and accesses operating processes locally while a network connection does not exist. For example, the power handling thermostat 220 can obtain operating processes from the thermostat application server 260, a website, or a database based on the thermostat control unit 210 having a connection to one or more networks 205. Based on the thermostat control unit 210 losing connection to the one or more networks 205, the power handling thermostat 220 can access operating processes locally and can operate the HVAC system or one or more HVAC system components based on the accessed processes. For example, the power handling thermostat 220 can locally maintain a process for operating an HVAC system configuration featuring a single heat, single cool, stand-alone humidifier configuration. Based on the thermostat not having access to one or more network connections, the thermostat can operate using the locally available process. Based on determining that a connection to one or more networks 205 becomes available or is reestablished, the power handling thermostat 220 can access and utilize operating processes specific to the particular HVAC system configuration or the one or more particular HVAC system components featured in the system. In some implementations, accessing and obtaining operating processes can be achieved by a local connection to a device storing or having access to operating processes, for example, by a local connection to a mobile device 240, 250 using a USB, Ethernet, or other connection.

In some implementations, operating processes received by the power handling thermostat 220 can be stored locally. Storing the processes locally can enable the HVAC system to continue to operate using the received operating processes, regardless of interruptions in network connectivity and/or discontinuance of services related to network connectivity, access to the thermostat application server 260, or access to use of the native control applications 242, 252 loaded at mobile devices 240, 250.

In some instances, processes relating to the operation of a particular HVAC system configuration or one or more particular HVAC system components can be updated by a user, technician, or other individual, and the power handling thermostat 220 can operate the HVAC system or one or more particular HVAC system components based on the updated process. For example, a user can access a menu or other interface at the power handling thermostat 220 or using a native control application 242, 252 associated with a mobile device 240, 250, and can update parameters or other inputs to a particular process. The power handling thermostat 220 can access the updated process, and can operate the HVAC system or one or more components of the HVAC system based on the updated process. For example, an HVAC system can be a two-stage HVAC system and a user of the system may want to turn on each stage of the HVAC based on particular timing. In this example, the user may want the first HVAC system stage to turn on in order to achieve a target temperature within a property, and the user may further want the second HVAC system stage to turn on five minutes after the first HVAC system stage turns on based on the target temperature not being achieved after the five minute period.

Based on receiving one or more processes relating to the operation of an HVAC system associated with a property and/or one or more updated processes relating to the operation of the HVAC system, the power handling thermostat 220 can execute operations to control the HVAC system based on the received processes. In some instances, the processes can identify one or more controller constant values used by the thermostat to determine on/off cycling of HVAC system components, and the thermostat can operate the HVAC system based on a process that utilizes the controller constant values. For example, the controller constant values can be values relating to a proportional-integral-derivative (PID) controller, and the power handling thermostat 220 can operate the HVAC system based on the received PID controller values. In other examples, a process received by the power handling thermostat 220 can be another process, for example, a set of rules or a piece of code, and the thermostat can control the HVAC system based on the received rules or code.

In some implementations, receiving an updated process used by a power handling thermostat 220 can include replacing or updating a preexisting process with the received, updated process. For example, the power handling thermostat 220 can maintain a process for controlling an HVAC system associated with a property, and based on receiving an updated process, the power handling thermostat 220 can update the preexisting process and can control the HVAC system using the updated process. In some instances, using the updated process can include updating values used by a preexisting process to control the HVAC system, and controlling the HVAC system using the process that features the updated values. For example, an updated process may specify updated PID controller values, and the power handling thermostat 220 can update values associated with a preexisting PID controller with the updated values to control the HVAC system using the updated process. In other instances, the thermostat can utilize an updated process by replacing, editing, or supplementing a set of rules or code associated with a preexisting process with the updated rules or code, and controlling the HVAC system using the updated rule set or code.

In some instances, a process or updated process received by the thermostat 220 is used in controlling an HVAC system associated with a property. For example, a process or updated process relating to how a thermostat controls an air conditioner of an HVAC system can be used to determine when the thermostat should turn the air conditioner on and off in order to achieve and maintain a user-identified target temperature. A process or updated process may cause the thermostat to activate the air conditioner, for example, at all times while a temperature within the property is two or more degrees above the user-identified target temperature, to activate the air conditioner for five minutes before deactivating the air conditioner for five minutes while the temperature at the property is zero to two degrees above the target temperature, and to turn the air conditioner off while the temperature within the property is less than or equal to the target temperature. While the received and/or updated processes used by the power handling thermostat 220 to control the HVAC system can alter the functionality of the HVAC system, the received and/or updated processes generally do not affect user-identified target conditions for property, e.g., a user-identified preferred temperature and/or humidity level within the property. Rather, a process or updated process can use the user-identified target conditions as inputs in determining operation of the HVAC system and how the HVAC system is controlled to reach the target conditions.

In some implementations, the power handling thermostat 220 can be capable of intelligently updating and/or learning control processes for operating an HVAC system associated with a property. For example, the thermostat can track the operation of an HVAC system over a period of time as well as changes in environmental conditions within the property over the period of time, and the thermostat can dynamically update control processes based on the tracked operation and environmental conditions data. In some instances, the power handling thermostat 220 can be capable of learning and/or updating control processes based on neural network learning techniques, or based on other computer learning processes. In some instances, the power handling thermostat 220 can use intelligent updating and/or learning to alter control values used by a control process, to alter rules associated with a control process, or to select or update particular computer code used to control the HVAC system associated with the property.

In some instances, control process learning and/or updating can be used to increase the efficiency of an HVAC system associated with a property. For example, updates to a control process can be received by a power handling thermostat 220 and/or the thermostat can intelligently update or perform learning with respect to a control process to increase the energy efficiency of the HVAC system. For example, a power handling thermostat 220 capable of intelligently updating a control process can use feedback data indicating energy efficiency of the HVAC system in conjunction with data indicating an operating history of the HVAC system to update a control process, with the aim of the updated process being to increase the energy efficiency of the HVAC system operation.

In some implementations, a control process can be updated to increase the effectiveness of an HVAC system in achieving user-identified environmental conditions within a property. For example, updates to a control process can be received by a power handling thermostat 220 and/or the thermostat can intelligently update or perform learning with respect to a control process to increase the effectiveness of the HVAC system in achieving user-identified conditions. For example, a power handling thermostat 220 can receive and implement an updated control process that is based on historical data indicating the rate and accuracy with which the HVAC system achieves user-identified conditions in conjunction with data indicating an operating history of the HVAC system, and the updated process can be used to increase the rate at which the HVAC system can match environmental conditions within the property to user-identified target conditions.

In some implementations, information relating to environmental conditions at the property, activity at the property, current weather, and/or weather forecasts can be obtained and can be used to determine the operation of the HVAC system controlled by the power handling thermostat 220. For example, environmental data and/or data indicating activity at the property can be obtained from one or more sensors associated with the module 230, and weather conditions and/or weather forecasts can be obtained from the thermostat application server 260 or using connections to one or more networks 205. Based on the information, the operating processes and/or the operation of the HVAC system can be updated.

In some instances, an operating process and/or the operation of an HVAC system associated with a property can be updated to conserve energy during particular times. For example, based on activity sensors at a property determining that no residents of the property are at the property during the daytime for the days Monday through Friday, an operating process for the HVAC system associated with the property can be updated to conserve energy during those times. For example, operation of the HVAC system can be updated such that components of the HVAC system are operated or cycled less frequently, thereby causing the HVAC system to achieve a target temperature at a slower rate than if residents of the property are at the property. In another example, operation of the HVAC system can be updated based on no one occupying the property at a particular time such that the HVAC takes greater advantage of current and/or anticipated weather conditions at the property. For instance, based on weather data for a geographic region of the property indicating that outdoor temperatures will be closer to a target temperature at a time later in the day when residents of the property typically return home, the HVAC system may operate to take advantage of the changing temperatures, thereby increasing energy efficiency. For example, components of the HVAC system may be operated at a reduced cycling frequency to reduce energy consumption while still reaching a target temperature by the time residents typically return to the property. In another example, an operating process associated with an HVAC system having an air conditioner can indicate that the air conditioner should turn on in the event that the outside temperature at the property is above a certain temperature, regardless of the internal property temperature. By turning on the air conditioner prior to the temperature in the property increasing drastically, the HVAC system may achieve overall improved energy efficiency.

In some instances, operating processes can be dynamically updated and/or dynamically evolve to incorporate additional variables, e.g., environmental data, activity, weather, resident locations, etc., and data from different sources, e.g., from mobile devices 240, 250 associated with residents of the property, weather service providers, etc. In some instances, operating processes can be updated and/or evolve to incorporate additional variables based on data pertaining to the additional variables becoming available or sufficient to use in updating and/or evolving the control processes.

For example, weather data can be incorporated into a process for controlling an HVAC system based on obtained weather data being available and/or being sufficient to demonstrate weather patterns or trends. The weather data can be incorporated into a control process associated with the HVAC system to increase the efficiency of HVAC system operation, to schedule HVAC system operation based on weather forecast data, or to control an HVAC system based on a target energy usage amount or energy usage cost for a period of time, e.g., to save energy consumption at a particular point in time based on a weather forecast indicating a future heat wave that will prompt increased energy usage. In some examples, energy consumption data can be incorporated into processes for operating an HVAC system, where the energy consumption data can be used to determine operation of the HVAC system based on a predicted energy usage amount or predicted energy cost associated with operating the HVAC system for a certain period of time. In some instances, energy consumption data can be data collected from the property and/or from the HVAC system associated with the property, and can be based on energy consumption data collected from the property over a period of time. In still other examples, data relating to user activity, resident locations, and/or user inputs relating to the HVAC system can be incorporated in an HVAC system control process by updating the process and/or by the process evolving, e.g., through a computer learning technique. For example, user inputs that have been tracked over time can indicate that a user frequently increases the target temperature for a property when leaving the property, and a process for controlling the HVAC system of the property can incorporate this data, for example, by affecting how the HVAC system achieves a target user-input temperature during times when residents are away from the property.

In some instances, performance, energy efficiency, maintenance needs, and other information regarding an HVAC system or components of an HVAC system can be accessed over one or more networks 205 associated with the power handling thermostat 220. For example, the thermostat control unit 210 can operate as a gateway device, and installers, technicians, or other users can access information relating to the status of the HVAC system or one or more HVAC system components. In some instances, accessing the information can involve accessing the information over one or more networks using a native control application 242, 252 associated with a mobile device 240, 250, can involve accessing the information via the thermostat application server 260, or can involve accessing the information using another device over one or more networks 205, e.g., a website.

The power handling thermostat can utilize performance, energy efficiency, maintenance, and other information relating to an HVAC system to detect errors or faults in the HVAC system. Based on detecting an error, the power handling thermostat can report the error, for example, to an installer, technician, monitoring service provider, or home owner. In some instances, the error can be reported at a display of the power handling thermostat, or can be reported at a web or mobile-based application, for example, by transmitting information identifying the error over one or more networks 205.

For example, a boiler component of an HVAC system associated with a power handling thermostat might report that it has an output temperature that is above an allowable limit and, in response, the boiler may be turned off. In this case, the power handling thermostat may additionally issue a report to users indicating that the boiler was turned off due to the boiler's output temperature being outside of the allowable limit. In another example, a fault relating to an air conditioner can cause the air conditioner to run constantly without achieving a target temperature in a home. Such a fault may result in many errors being detected by the system. A first error may be reported by the power handling thermostat indicating that the target temperature has not been achieved despite the air conditioner being active. A second error may be reported based on temperature sensors within the home indicating that the temperature within the house has not reached the target temperature within a sixty minute period, when a typical time to reach the target temperature is forty minutes. Still a third error may be reported based on determining that the HVAC system is consuming 4.0 kWh of energy per hour when typical energy consumption levels are 2.5 kWh of energy per hour. Thus, error and fault detection can utilize robust and redundant methods to accurately report errors, and can monitor the entire home and HVAC system as opposed to only individual HVAC system components.

In some implementations, the power handling thermostat 220 can include or be adapted to include a dynamic serial interface that allows the thermostat to operate HVAC systems and HVAC system components featuring digital communication links. For example, the power handling thermostat 220 can feature dynamic 24 V relay connections and terminals, and can additionally or alternatively feature dynamic serial interfaces. In some instances, the power handling thermostat 220 featuring serial interfaces can be updated and/or upgraded to support new functionality for HVAC systems or HVAC system components, and/or can adapt to new protocols associated with use of HVAC systems or HVAC system components that feature serial interfaces. Such updates and/or upgrades can be achieved locally, for example, by transmitting the updates to the thermostat via a plug-in device or mobile device 240, 250, or can be achieved through a remote connection, for example, a connection to one or more networks 205.

Figure 3:
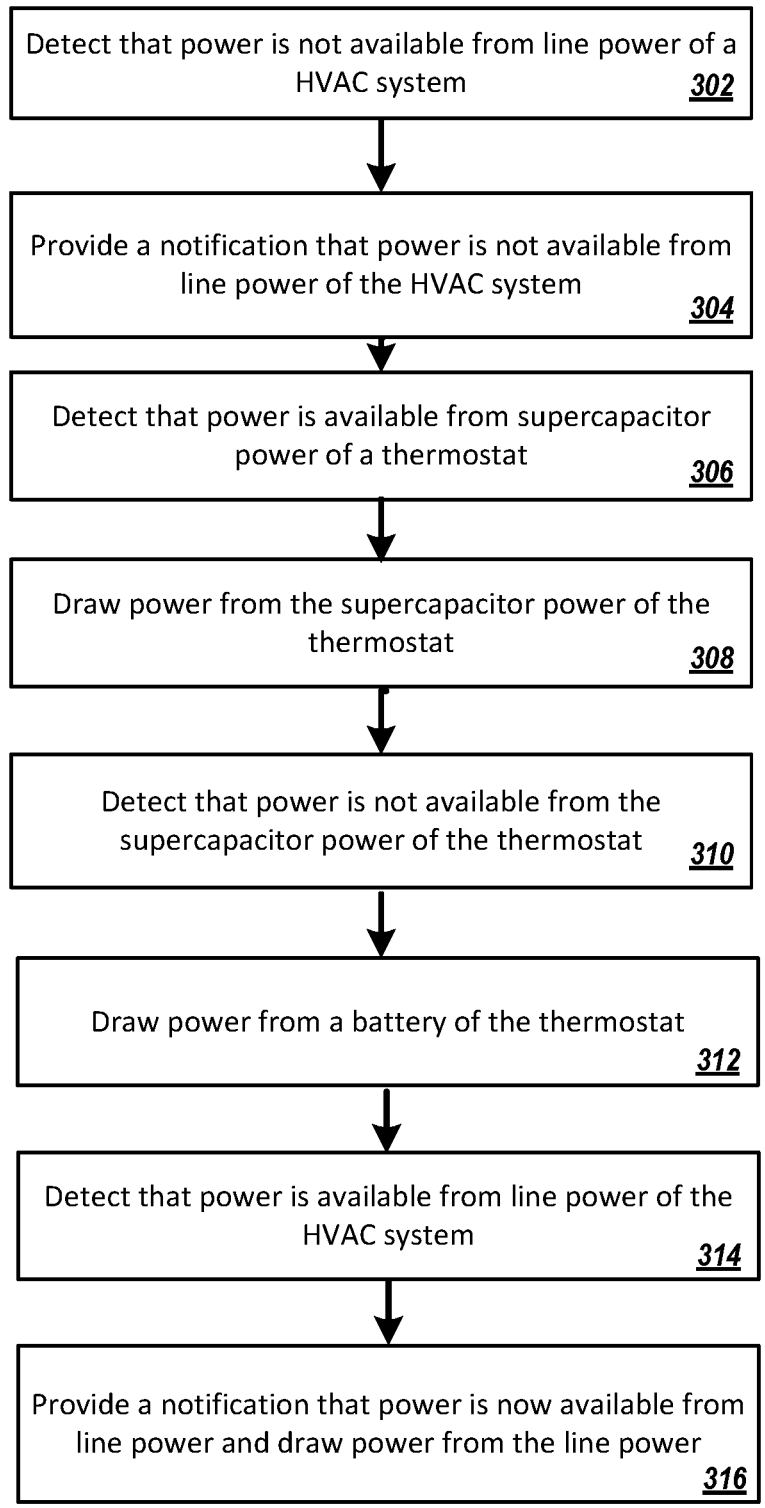
FIG. 3 illustrates a flow chart of an example process.

FIG. 3 illustrates an example process of power handling by a power handling thermostat. In some implementations, the process 300 can be performed by the system 100 of FIGS. 1A-1C.

The system detects that power is not available from line power of a HVAC system (302). For example, the thermostat 110 may determine that the voltage difference between a power wire and a common wire from the HVAC system is 0V so outside a range of 24-25V and, in response, determine that power is not available from line power.

The system provides a notification that power is not available from the line power of the HVAC system (304). For example, the thermostat 110 provides the server 160 a notification that line power is no longer available.

The system detects that power is available from supercapacitor power of a thermostat (306). For example, the thermostat 110 detects that the supercapacitor can provide 6V of power and, in response, determines that power is available from supercapacitor power.

The system draws power from the supercapacitor power of the thermostat (308). For example, the thermostat 110 draws 6V from the supercapacitor for a sustained period of time.

The system detects that power is not available from the supercapacitor power of the thermostat (310). For example, the thermostat 110 draws power from the supercapacitor until 6V can no longer be drawn from the supercapacitor and, in response, detects that power is not available from the supercapacitor power.

The system draws power from a battery of the thermostat (312). For example, the thermostat 110 draws power for an extended period of time from two AAA batteries housed in the thermostat 110.

The system detects that power is available from line power of the HVAC system (314). For example, the thermostat 110 detects a 24V difference across a power wire and a common wire from the HVAC system.

The system provides a notification that power is now available from line power and draws power from the line power (316). For example, the thermostat 110 stops drawing power from the battery and instead draws power from the line power and provides a notification to the server 160 that it is now drawing power from the line power.

In some implementations, similarly to how the process 300 is described above as including detecting that power is not available from line power of a HVAC system and detecting that power is available from supercapacitor power of a thermostat, a process may include determining that (i) power to a thermostat is not available from line power of a ventilation system and (ii) power is available from a supercapacitor in the thermostat and, in response, drawing power from the supercapacitor instead of from the line power. For example, the thermostat 110 may determine a difference between a power wire and a common wire from the HVAC system is 0V so not within a range of 24-25V and, in response, determine that power is not available from line power, and determine that the supercapacitor can provide 6V of power and, in response, determine that power is available from supercapacitor power. Accordingly, in the example, the thermostat 110 may then draw power from the supercapacitor instead of the line power.

As discussed above in connection with FIGS. 1A-1C, in a process such as process 300, one or more of the supercapacitor may be charged through power across a closed relay of the thermostat that is connected to component of the ventilation system, the thermostat may be configured to close the relay to charge the supercapacitor while power is available to the thermostat from the line power of the ventilation system, the thermostat may be configured to quickly close and open the relay such that the component is not turned on while the supercapacitor is being charged, or while power is not available to the thermostat from the line power of the ventilation system, the thermostat may only close the relay to control the component of the ventilation system.

The described systems, methods, and techniques may be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed application-specific integrated circuits (ASICs).

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method, comprising:
   determining, by a thermostat, that (i) power to the thermostat is not available from line power of a ventilation system and (ii) power is available from a supercapacitor in the thermostat;
   in response to determining that (i) power to the thermostat is not available from line power of the ventilation system and (ii) power is available from the supercapacitor in the thermostat, drawing, by the thermostat, power from the supercapacitor instead of from the line power while not drawing power from a battery in the thermostat;
   determining, by the thermostat, that power is no longer available from the supercapacitor and is still not available from the line power of the ventilation system;
   in response to determining that power is no longer available from the supercapacitor and is still not available from the line power of the ventilation system, drawing, by the thermostat, power from the battery in the thermostat instead of from the supercapacitor;
   determining that (i) no relays of the thermostat are closed and (ii) the supercapacitor of the thermostat has a charge that satisfies a charging criteria;
   in response to determining that (i) no relays of the thermostat are closed and (ii) the supercapacitor of the thermostat has a charge that satisfies the charging criteria, quickly closing and opening a relay to a component of the ventilation system such that the component is not turned on and the supercapacitor is further charged through the relay;
   determining, by the thermostat, that power to the thermostat is available from the line power of the ventilation system; and
   in response to determining that power to the thermostat is available from the line power of the ventilation system, drawing, by the thermostat, power from the line power of the ventilation system.

2. The method of claim 1, wherein the supercapacitor is charged through power across a closed relay of the thermostat that is connected to the component of the ventilation system.

3. The method of claim 2, wherein the thermostat is configured to close the relay to charge the supercapacitor while power is available to the thermostat from the line power of the ventilation system.

4. The method of claim 3, wherein the thermostat is configured to quickly close and open the relay such that the component is not turned on while the supercapacitor is being charged.

5. The method of claim 4, wherein while power is not available to the thermostat from the line power of the ventilation system, the thermostat only closes the relay to control the component of the ventilation system.

6. The method of claim 1, wherein determining that power to a thermostat is not available from line power of a ventilation system comprises:
   determining that the line power is not providing power within a predetermined voltage range.

7. The method of claim 1, comprising:
   providing notification that power is switching from being drawn from the line power to being drawn from the supercapacitor.

8. A system comprising:
   one or more computers and one or more storage devices storing instructions that are operable, when executed by the one or more computers, to cause the one or more computers to perform operations comprising:
      determining, by a thermostat, that (i) power to the thermostat is not available from line power of a ventilation system and (ii) power is available from a supercapacitor in the thermostat;
      in response to determining that (i) power to the thermostat is not available from line power of the ventilation system and (ii) power is available from the supercapacitor in the thermostat, drawing, by the thermostat, power from the supercapacitor instead of from the line power while not drawing power from a battery in the thermostat;
      determining, by the thermostat, that power is no longer available from the supercapacitor and is still not available from the line power of the ventilation system;
      in response to determining that power is no longer available from the supercapacitor and is still not available from the line power of the ventilation system, drawing, by the thermostat, power from the battery in the thermostat instead of from the supercapacitor;
      determining that (i) no relays of the thermostat are closed and (ii) the supercapacitor of the thermostat has a charge that satisfies a charging criteria;
      in response to determining that (i) no relays of the thermostat are closed and (ii) the supercapacitor of the thermostat has a charge that satisfies the charging criteria, quickly closing and opening a relay to a component of the ventilation system such that the component is not turned on and the supercapacitor is further charged through the relay;
      determining, by the thermostat, that power to the thermostat is available from the line power of the ventilation system; and
      in response to determining that power to the thermostat is available from the line power of the ventilation system, drawing, by the thermostat, power from the line power of the ventilation system.

9. The system of claim 8, wherein the supercapacitor is charged through power across a closed relay of the thermostat that is connected to the component of the ventilation system.

10. The system of claim 9, wherein the thermostat is configured to close the relay to charge the supercapacitor while power is available to the thermostat from the line power of the ventilation system.

11. The system of claim 10, wherein the thermostat is configured to quickly close and open the relay such that the component is not turned on while the supercapacitor is being charged.

12. The system of claim 11, wherein while power is not available to the thermostat from the line power of the ventilation system, the thermostat only closes the relay to control the component of the ventilation system.

13. The system of claim 8, wherein determining that power to a thermostat is not available from line power of a ventilation system comprises:
    determining that the line power is not providing power within a predetermined voltage range.

14. The system of claim 8, the operations comprising:
    providing notification that power is switching from being drawn from the line power to being drawn from the supercapacitor.

15. A non-transitory computer-readable medium storing software comprising instructions executable by one or more computers which, upon such execution, cause the one or more computers to perform operations comprising:

determining, by a thermostat, that (i) power to the thermostat is not available from line power of a ventilation system and (ii) power is available from a supercapacitor in the thermostat;

in response to determining that (i) power to the thermostat is not available from line power of the ventilation system and (ii) power is available from the supercapacitor in the thermostat, drawing, by the thermostat, power from the supercapacitor instead of from the line power while not drawing power from a battery in the thermostat;

determining, by the thermostat, that power is no longer available from the supercapacitor and is still not available from the line power of the ventilation system;

in response to determining that power is no longer available from the supercapacitor and is still not available from the line power of the ventilation system, drawing, by the thermostat, power from the battery in the thermostat instead of from the supercapacitor;

determining that (i) no relays of the thermostat are closed and (ii) the supercapacitor of the thermostat has a charge that satisfies a charging criteria;

in response to determining that (i) no relays of the thermostat are closed and (ii) the supercapacitor of the thermostat has a charge that satisfies the charging criteria, quickly closing and opening a relay to a component of the ventilation system such that the component is not turned on and the supercapacitor is further charged through the relay;

determining, by the thermostat, that power to the thermostat is available from the line power of the ventilation system; and in response to determining that power to the thermostat is available from the line power of the ventilation system, drawing, by the thermostat, power from the line power of the ventilation system.

16. The medium of claim 15, wherein the supercapacitor is charged through power across a closed relay of the thermostat that is connected to the component of the ventilation system.

17. The medium of claim 16, wherein the thermostat is configured to close the relay to charge the supercapacitor while power is available to the thermostat from the line power of the ventilation system.

18. The medium of claim 17, wherein the thermostat is configured to quickly close and open the relay such that the component is not turned on while the supercapacitor is being charged.

19. The system of claim 18, wherein while power is not available to the thermostat from the line power of the ventilation system, the thermostat only closes the relay to control the component of the ventilation system.

* * * * *